United States Patent [19]
Nemir et al.

[11] Patent Number: 5,168,673
[45] Date of Patent: Dec. 8, 1992

[54] METHOD AND APPARATUS FOR DAMPING VIBRATIONS

[76] Inventors: David C. Nemir, 1221 Baltimore Dr., El Paso, Tex. 79902; Roberto A. Osegueda, 401 Francisco, El Paso, Tex. 79912

[21] Appl. No.: 643,926
[22] Filed: Jan. 17, 1991
[51] Int. Cl.⁵ .......................... E04B 1/98; E04H 9/02; F16F 9/00
[52] U.S. Cl. ......................................... 51/1; 52/167 R
[58] Field of Search ................... 52/1, 167 R, 167 DF, 52/167 CB, 573

[56] References Cited

U.S. PATENT DOCUMENTS

| | | | |
|---|---|---|---|
| 3,796,017 | 3/1974 | Meckler | 52/167 CB |
| 3,807,678 | 4/1974 | Karnopp et al. | 248/358 R |
| 4,429,496 | 2/1984 | Masri | 52/1 |
| 4,635,892 | 1/1987 | Baker | 248/550 |
| 4,742,998 | 5/1988 | Schubert | 267/136 |
| 4,799,339 | 1/1989 | Kobori et al. | 52/1 |
| 4,841,685 | 6/1989 | Masri et al. | 52/1 |
| 4,910,929 | 3/1990 | Scholl | 52/167 R |
| 4,921,272 | 5/1990 | Ivers | 280/707 |
| 4,922,667 | 5/1990 | Kobori et al. | 52/167 DF |
| 4,929,874 | 5/1990 | Mizuno et al. | 318/128 |
| 5,025,599 | 6/1991 | Ishii et al. | 52/1 |
| 5,036,633 | 8/1991 | Kobori et al. | 52/1 |

FOREIGN PATENT DOCUMENTS 59-205036 11/1984 Japan .

OTHER PUBLICATIONS

"Active Seismic Response Control Systems for Nuclear Power Plant Equipment Facilities" by Kobori, et al *Nuclear Engineering and Design*, vol. 111 pp. 351-356 1989.

*Primary Examiner*—James L. Ridgill, Jr.
*Attorney, Agent, or Firm*—Deborah A. Peacock; Donovan F. Duggan

[57] ABSTRACT

The invention discloses methods and apparatuses for vibrational energy removal in a structural system. Sensors in the structure determine the vibration modal energy content of the structure only in real time, and detect whether controllable springs or "stiffeners" are in tension, compression, or are relaxed. Relaxed springs are stiffened or made less stiff so as to transfer energy in low vibrational modes into higher modes resulting in an accelerated passive dissipation of system energy. The technique is applicable for vibration damping in aircraft, watercraft, drilling platforms, space, civil, and other structures.

36 Claims, 6 Drawing Sheets

METHOD AND APPARATUS FOR DAMPING VIBRATIONS

BACKGROUND OF THE INVENTION

1. Field of the Invention (Technical Field)

The invention relates to apparatuses for dissipating vibrational energy in static and non-static structures, for example, civil structures and space platforms, respectively, and methods for their use.

2. Background Art

The past two decades have witnessed substantial activity in the area of vibration control of structures. Traditionally, detection by sensors and application of out-of-phase forces have been employed. U.S. Pat. No. 4,841,685, to Masri, et al., entitled *Controllable Damper;* U.S. Pat. No. 4,429,496, to Masri, entitled *Method and Apparatus for Active Control of Flexible Structures;* and U.S. Pat. No. 4,929,874, to Mizuno, et al., entitled *Vibration Control System,* are all representative of this approach. Such systems require tremendous energy, are subject to overcorrection and modal spillover, and are basically limited to correction of the swaying mode of vibration.

U.S. Pat. No. 4,742,998, to Schubert, entitled *Active Vibration Isolation System Employing an Electro-Rheological Fluid;* U.S. Pat. No. 3,807,678, to Karnopp, et al., entitled *System for Controlling the Transmission of Energy Between Spaced Members;* and U.S. Pat. No. 4,921,272, to Ivers, entitled *Semi-Active Damper Valve Mean with Electromagnetically Movable Discs in the Piston,* all relate to variable damping means for limiting transmission of vibration.

U.S. Pat. No. 4,910,929, to Scholl, entitled *Added Damping and Stiffness Elements,* discloses the combination of damping and stiffness elements to optimize earthquake response in static buildings.

U.S. Pat. No. 4,799,339, to Kobori, et al., entitled *Method of Controlling Building Against Earthquake,* discloses a method of remotely sensing earthquake tremors and changing the resonant frequency of a static building based upon such remotely sensed tremors.

U.S. Pat. No. 4,635,892, to Baker, entitled *Active Vibration Suppressor* discloses a seismic mass movable in a direction opposing structural displacement.

Japanese Patent No. 59-205036, to Furukawa, entitled *Earthquake-Proofing Device,* discloses electromagnets for correcting positional deviation of the Structure.

The publication entitled *Active Seismic Response Control Systems for Nuclear Power Plant Equipment Facilities,* by Kobori, et al., discloses an active seismic response system which adjusts the structural resonant frequency to avoid resonant vibration.

None of the above references disclose an apparatus and method of sensing and measuring total energy, potential and kinetic, solely within a structure, static or non-static. Further, none of the references disclose an apparatus and method for dissipating such total energy by altering structural stiffness, thereby altering the modal energies of vibration of the structure.

SUMMARY OF THE INVENTION (DISCLOSURE OF THE INVENTION)

The present invention relates to methods and apparatuses for attenuating vibration in a structure. The invention comprises sensing the magnitude of selected vectorial conditions within the structure; calculating modal energy of the structure from the sensed vectorial conditions; and dynamically changing the stiffness of selected structural components of the structure, thereby changing the vibration characteristics of the modal energy of the structure. Strain may also be measured in predetermined structure components of the structure, preferably prior to sensing the magnitude of selected vectorial conditions within the structure. Strain may be measured using resistive strain gauges, magnetostrictive strain gauges, piezoelectric strain gauges, accelerometers, and the like. The magnitude of selected vectorial conditions may be sensed by sensing acceleration (e.g., using accelerometers, geophones, resistive strain gauges, piezoelectric strain gauges, magnetostrictive strain gauges, and the like), velocity (e.g., using piezoelectric films, linear variable displacement transducers, and the like), and/or displacement (e.g., using strain gauges, linear variable displacement transducers, laser interferometers, force sensing resistors, optical displacement gauges, sonar, radar, laser ranging devices, and the like).

To dynamically change the stiffness of selected structural components of the structure, selected structural components of the structure may be relaxed, such as by actuating a clamping electromagnet, actuating a changing piston, actuating an electrorheological fluid, actuating a ferrofluid, actuating an adaptive memory alloy member, or the like, or the stiffness may be changed by stiffening selected structural components, such as by actuating a clamping electromagnet, actuating a clamping piston, actuating an electrorheological fluid, actuating a ferrofluid, actuating an adaptive memory alloy member, or the like.

Accordingly, it is an object of the invention to provide an apparatus and method for altering the modal distribution of the vibrational energy in a structural system.

It is a further object of the invention to change low mode vibrational energy into energy in higher frequency vibrational modes to more rapidly attenuate vibrational energy and reduce maximum displacements.

Yet another object of the invention is the transfer of energy in a particular vibrational mode to a different vibrational mode to redistribute structural stress.

A primary advantage of the invention is that it requires sensing only the present state of energy in a structure, regardless of source.

Another advantage of the invention is that it requires minimum expenditure of energy.

Yet another advantage of the invention is its universal application to static and non-static structures.

Yet another advantage of the invention is its relative inexpensiveness and ready adaptability to existing structures.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

DESCRIPTION OF THE PREFERRED EMBODIMENTS (BEST MODES FOR CARRYING OUT THE INVENTION)

The present invention relates to methods and apparatuses for vibrational energy removal or minimization in a structural system. The terms "vibration" or "vibrational energy," as used throughout the specification and claims, are intended to generally include all vibrations in civil structures, aircraft, and space vehicles, including those induced by water or fluid motion; weather conditions, such as wind or storms; earth or planetary movement, such as earthquakes, sliding, and volcanic activity; instability in aircraft or space vehicles, due to thermal expansion or contraction, and other weather conditions; vibrations in aircraft or space vehicles, induced by crew movements, orientation and control maneuvers, docking maneuvers, antenna movements, rotating machinery, weather conditions, and impacts; vibrations in any type of machinery, including vehicles and rotating machinery; and surrounding vibrations such as traffic.

Figure 1:
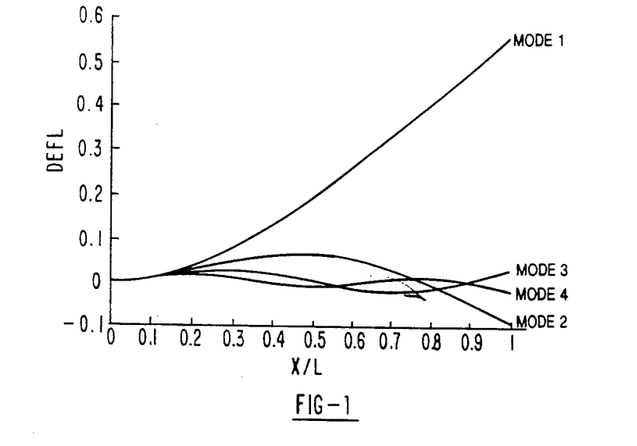
FIG. 1 is a graph of first, second, third, and fourth vibration mode displacements in cantilevers.

FIG. 1 is a graph depicting cantilever deflections for various modes of vibration. The cantilever beams all have the same energy content, and are depicted when all beam energy is potential energy. As seen in FIG. 1, for a given energy, maximum beam deflections are greatly reduced for higher modes of vibration. Additionally, energy is dissipated at a faster rate in higher modes.

Figure 2:
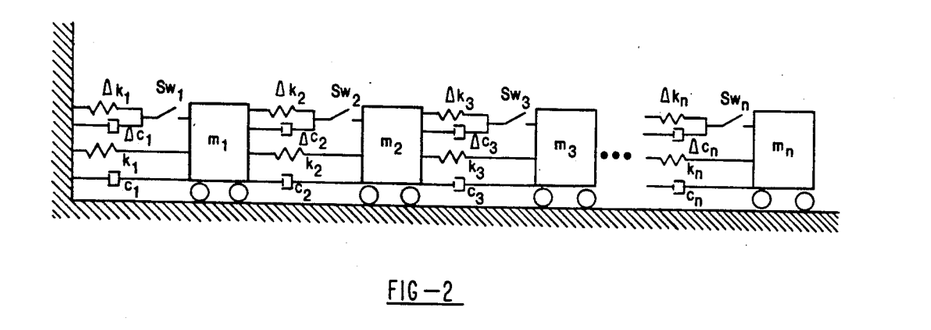
FIG. 2 is a schematic diagram of a spring-mass-damper system with controllable stiffness.

The preferred embodiment of the invention for structural motion control can be explained using the idealized lumped mass-spring-dashpot system depicted in FIG. 2. This structure has baseline idealized springs, dashpots and lumped masses of magnitudes $k_i$ and $c_i$ and $m_i$, respectively. Additional springs and dashpots $\Delta k_i$ and $\Delta c_i$ can be actively connected or disconnected by connections $Sw_1$, $Sw_2$, ... $Sw_n$ in parallel with the baseline.

The preferred embodiment of the invention encompasses control of relaxed springs as well as release of springs that are in tension or compression. Release of springs in a state of tension or compression serves to impact an impulse to the structure. Such impulse comprises all frequencies; accordingly, the objective of transferring energies in the compressed or stretched springs to energies in higher frequency vibrational modes is accomplished.

The connection can be made and released at any time. For the purposed of the specific embodiments of the invention disclosed in this application, the auxiliary springs are only released when strain is zero.

The dynamic motion of the nominal (no added parallel springs/dashpots) structure under some initial excitation is described by the following system of n equations:

$$M\ddot{y}(t) + C\dot{y}(t) + Ky(t) = f(t), \quad (1)$$

where M, C, and K are the global mass, damping and stiffness matrices of the nominal structure, f(t) is a vector of external forces, and y(t) is a vector of structural displacements. For the purposes of this disclosure, the damping matrix is assumed proportional to the stiffness and mass matrices, yielding the characteristic equation associated with (1):

$$[K - \lambda M]\Phi = 0, \quad (2)$$

where $\lambda$ is the undamped eigenvalue and $\Phi$ is the $n \times n$ modal matrix. The eigensolution of (2) yields n eigenvalues $\lambda_i$ with corresponding eigenvectors $\phi_i$. Because of the orthogonality conditions and the assumed proportional damping matrix, equation (1) can be decoupled by applying the modal transformation:

$$y(t) = \Phi q(t), \quad \dot{y}(t) = \Phi \dot{q}(t), \quad (3)$$

where q(t) and q̇(t) are the vectors of modal displacements and velocities, respectively. The transformed equation is a set of n second-order modal equations:

$$m^*_j \ddot{q}_j(t) + c^*_j \dot{q}_j(t) + k^*_j q_j(t) = f^*_j(t) \quad j = 1, 2, \ldots n \quad (4)$$

where $f^*_j$ is a modal force equal to $\phi_j^T f(t)$, and $m^*_j$, $c^*_j$, and $k^*_j$ are the modal mass, damping and stiffness of the $j^{th}$ mode and are given by $$m^*_j = \phi_j^T M \phi_j, \quad c^*_j = \phi_j^T C \phi_j, \quad k^*_j = \phi_j^T K \phi_j. \quad (5)$$

If the system is elastic and linear during a period of time, then the total energy (TE) of the system is the sum of strain (potential) energy (PE) and kinetic energy (XE) and is given by:

$$TE(t) = PE(t) + KE(t) = \tfrac{1}{2} y^T(t) K y(t) + \tfrac{1}{2} \dot{y}^T(t) M \dot{y}(t). \quad (6)$$

Using equations (3) and (5), the total energy can be decoupled into modal energies:

$$TE(t) = \tfrac{1}{2} \sum_{j=1}^{n} k^*_j q_j^2(t) + \tfrac{1}{2} \sum_{j=1}^{n} m^*_j \dot{q}_j^2(t) = \quad (7)$$

-continued $$\sum_{j=1}^{n} PE_j(t) + \sum_{j=1}^{n} KE_j(t),$$

where $PE_j(t)$ and $KE_j(t)$ are respectively the $j^{th}$ mode potential and kinetic energies at time t. If at some time $t=t_0$, one or more of the springs are relaxed, the corresponding active connections can be triggered or released, modifying the structure without an input of additional energy. Let the new structure's dynamic motion be given by the following system of equations:

$$M\hat{y}(\tau) + C\hat{y}(\tau) + K\hat{y}(\tau) = f(\tau), \tau = t - t_0 \quad (8)$$

subject to the initial conditions $$\hat{y}(\tau=0) = y(t=t_0), \hat{y}(\tau=0) = \dot{y}(t=t_0). \quad (9)$$

Where the caret ( ) indicates the quantity is from the new (modified) system. Under the proportional damping assumption, the eigensolution of the new structure is given by $$[\hat{K} - \lambda \hat{M}]\hat{\Phi} = 0, \quad (10)$$

to give new eigenvalues $\hat{\lambda}_j$ with new corresponding eigenvectors $\hat{\phi}_j$.

Since the eigenvectors have changed, the modal parameters of the modified structure are $$\hat{m}^*_j = \hat{\phi}_j^T \hat{M} \hat{\phi}_j, \hat{c}^*_j = \hat{\phi}_j^T \hat{C} \hat{\phi}_j, \hat{k}^*_j = \hat{\phi}_j^T \hat{K} \hat{\phi}_j. \quad (11)$$

and the total energy of the system is given by $$\hat{TE}(\tau) = \frac{1}{2} \sum_{j=1}^{n} \hat{k}^*_j \hat{q}_j^2(\tau) + \frac{1}{2} \sum_{j=1}^{n} \hat{m}^*_j \dot{\hat{q}}_j^2(\tau) = \quad (12)$$

$$\sum_{j=1}^{n} \hat{PE}_j(\tau) + \sum_{j=1}^{n} \hat{KE}_j(t).$$

Since the engagement/release of relaxed control springs does not add to the total energy of the initial system, the total energy at time $t=t_0$ is equal to the total energy in the modified system at time $\tau=0$. However, modifying structure stiffness in this way will result in a redistribution of modal energies. If the springs can be engaged/released in such a manner as to shift the energy distribution from lower modes to higher modes, the result will be an accelerated passive dissipation of the total energy system.

In real materials and structures, the viscous damping of vibrational energy is more pronounced for energy in the higher modes because of the faster energy absorption during cyclic straining. The control objective is thus to change the distribution of the modal energy at any time $t=t_0$ (every time an active brace (spring) is in a relaxed state) so that the modal energy content of the new system is steered to a desired state. Generally, it will be desirable to minimize energy in the lower modes. Assuming at a given time, $t_0$, there are a possible m control actions that can be taken, it is noted that a valid control action consists of either connecting or releasing a relaxed spring in the system. The cost function is defined as:

$$J_k(t_0) = \sum_{i=1}^{n} \alpha_i [PE_i^k(t_0) + KE_i^k(t_0)], k = 1, 2, \ldots, m \quad (13)$$

where $\alpha_i$, $i=1,2,\ldots n$ is set of weighting factors and $PE_i^k(t_0)$ and $KE_i^k(t_0)$ are respectively the potential and kinetic energies in the $i^{th}$ mode if the $k^{th}$ control action is taken. For example, if at time $t_0$ there are d relaxed springs in the system, then there are a possible $m=2^d$ control actions that can be taken (with each relaxed spring allowed to have either a connected or released state). Thus, there are m costs that can be computed from equation (13), each corresponding to one possible set of control actions. The particular control action chosen will correspond to the set of connection conditions that results in minimum cost.

Figure 3:
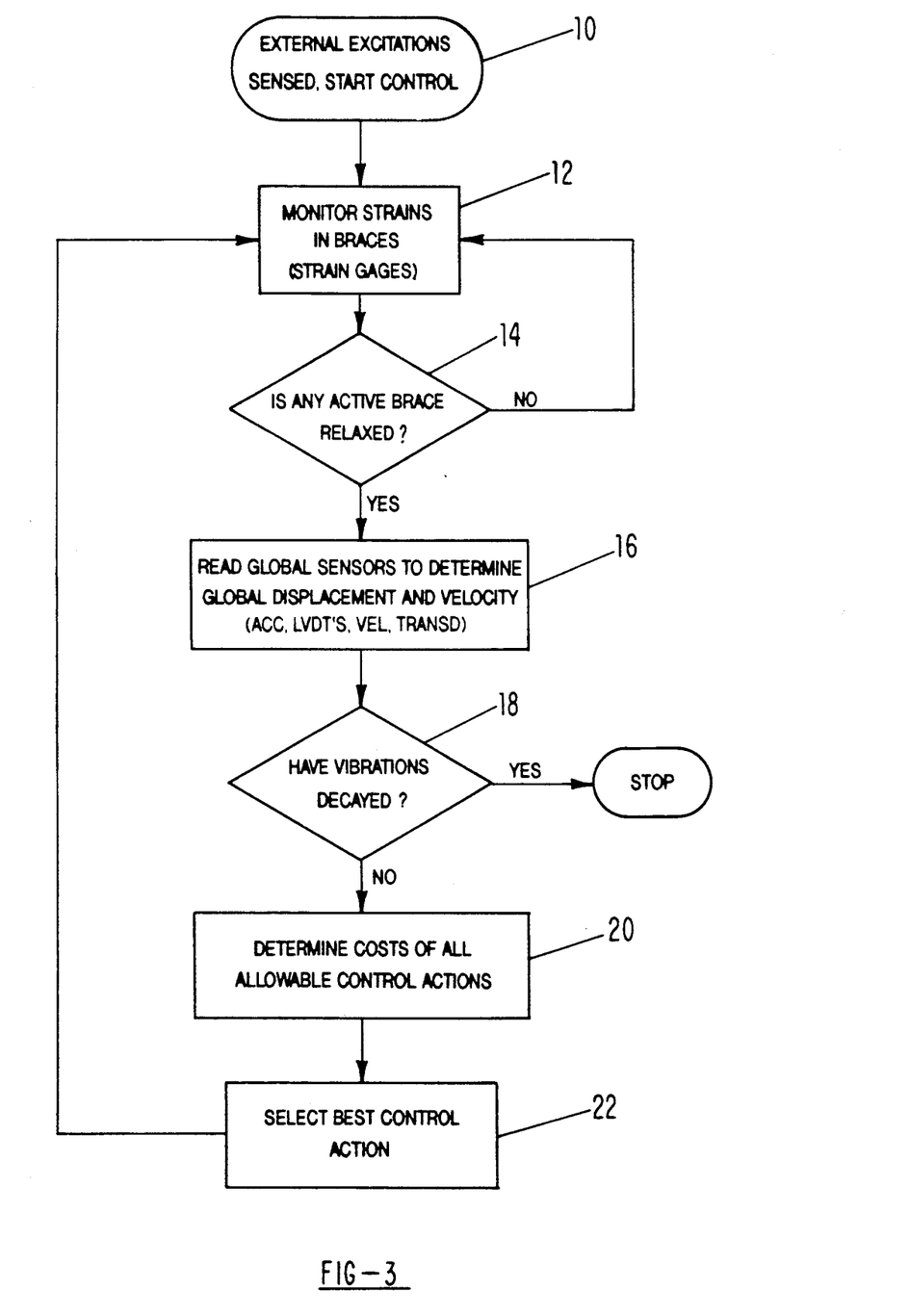
FIG. 3 is a flow chart of the preferred method of the invention.

The preferred method of the invention is illustrated in the flow chart of FIG. 3. First, sensors in the structure detect when there is a disturbance to and within the structure and initiate the method of control 10. Next, strains are monitored 12 in each active brace/spring of the structure. If the strains in any springs are close to zero, those springs are identified as being relaxed and become control candidates 14. Sensor readings from the structure are then used 16 to determine global displacements and velocities, y and ẏ. Equation (6) is used to compute the total energy in the system. If the total energy falls below some threshold level, the method terminates 18.

If the system still contains an unacceptable level of structural energy, equation (3) is used to convert global coordinates into modal coordinates for each of the candidate eigenstructures. Note that if there are d relaxed springs, there will be $2^d$ control candidates and consequently $2^d$ different modal matrices and $2^d$ different sets of modal coordinates. Fortunately, the modal matrices will be characteristic of the candidate system structures and can be computed ahead of time. Equation (12) allows the determination of modal potential and kinetic energies in each of the $m=2^d$ control candidates. Equation (13) generates a cost for each of these candidates 20. The control action that yields the minimum cost is chosen 22 and the method repeats 12.

Simulations of the preferred method of the invention with a three degree-of-freedom lumped parameter model similar to that shown in FIG. 2, are illustrated in FIGS. 4–9. In these simulations, the initial spring constants are $k_1=k_2=k_3=100$ N/m, the masses are $m_1=m_2=m_3=1$ Kg and $f(t)=0$.

Figure 4:
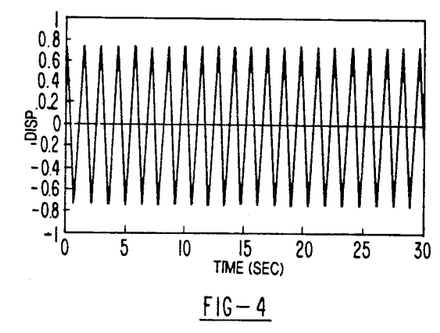
FIG. 4 is a graph of undamped first mode displacements relative to time.
Figure 5:
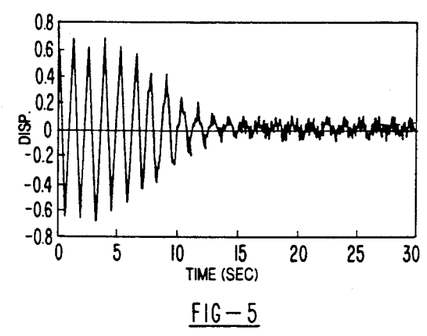
FIG. 5 depicts the displacements that occur when first mode energy is converted into third mode energy.
Figure 6:
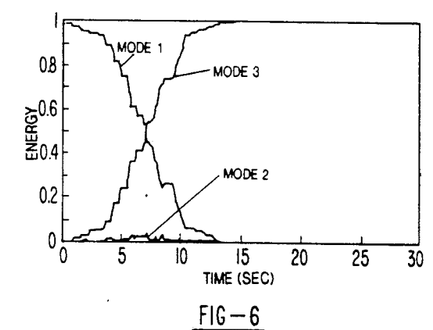
FIG. 6 is a graph contrasting the modal energies corresponding to the plot in FIG. 5.
Figure 7:
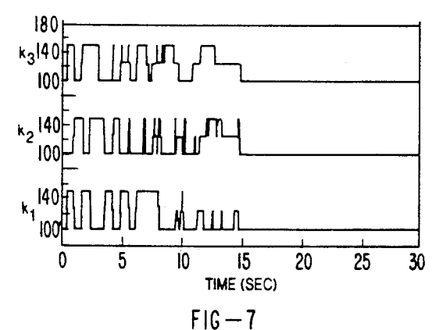
FIG. 7 is a plot of spring constants with respect to time corresponding to the plot in FIG. 5.

The first simulation study, illustrated in FIGS. 4–7, demonstrates the efficacy of the method in transferring energy from an initial condition of all first mode excitation to a condition of all third mode in an undamped system ($c_i = \Delta c_i = 0$, $i=1,2,3$). FIG. 4 portrays the tip displacement of the system in free vibration subsequent to an initial first mode displacement. In this case there was no control. FIG. 5 depicts the results obtained when using the method of FIG. 3. The performance index was formulated as in equation (13), where $\alpha_1 = \alpha_2 = 1$, and $\alpha_3 = 0$, thus penalizing first and second mode content. The candidate springs used for control in each of the three spring locations were taken from the set $\{100, 125, 150\}$ (in other words, the nominal value, 25% over nominal and 50% over nominal). As seen in FIG. 5, the displacements acquire a very definite third mode content in a time corresponding to only a few cycles of first mode. This is made clearer by the graph shown in FIG. 6 where the energies in the three modes are contrasted. Since the system is undamped, the total energy remains constant, but the energy content is virtually all third mode after 14 seconds. The control efforts are reflected by the piecewise constant spring control as shown in FIG. 7.

Figure 8:
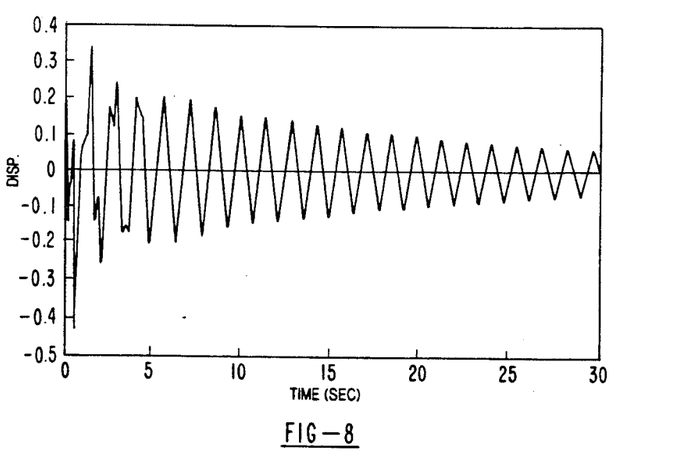
FIG. 8 is a graph depicting uncontrolled damped multimode excitation relative to time.
Figure 9:
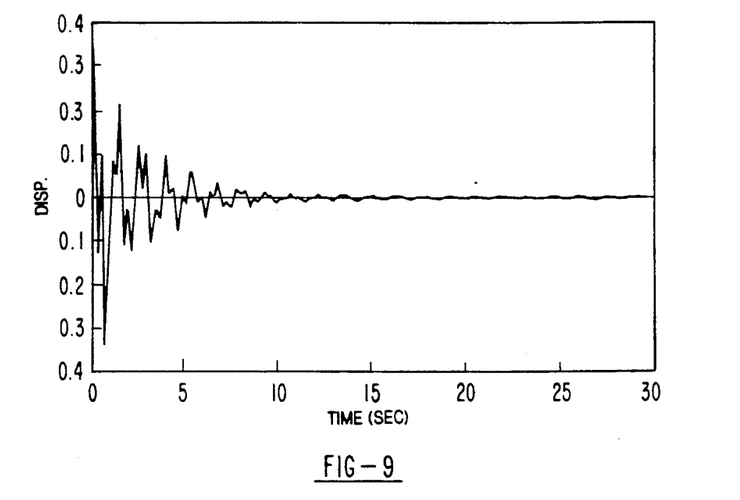
FIG. 9 is a graph depicting controlled damped multimode excitation relative to time.

The second simulation study, illustrated in FIGS. 8 and 9, shows the free vibration of a damped system due to a multi mode excitation. Dampers, acting in parallel with the springs, are selected so that the damping matrix is proportional to the stiffness with the first modal damping ratio equal to 0.01. The initial displacement condition is given as $$y(t_0) = (\phi_1 + \phi_2 + \phi_3)/3 \tag{14}$$

that is, the initial deflection consists of equal parts of first, second, and third mode displacements. FIG. 8 depicts the free vibration response of the system when there is no applied control. After about seven (7) seconds, the vibration is primarily first mode. This is because the second and third modes damp out faster. FIG. 9 portrays the same system with an applied control. The control objective is to minimize first mode content ($\alpha_1 = 1$, $\alpha_2 = \alpha_3 = 0$ in equation (13)). The candidate springs to be controlled at each of the three spring locations were taken to be from the set {100,110,120}. These correspond to the nominal value, 10% over nominal and 20% over nominal. Compared to FIG. 8, a dramatic decrease in the amplitude of vibration can be noted.

Figure 10:
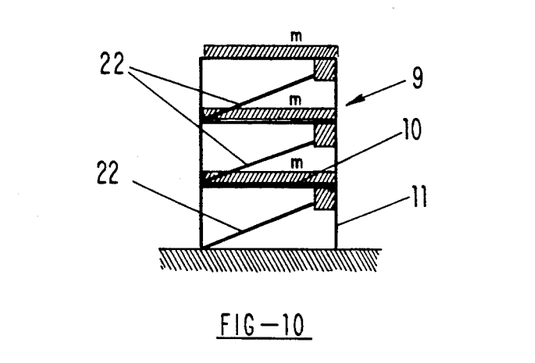
FIG. 10 is a multistory model.
Figure 11:
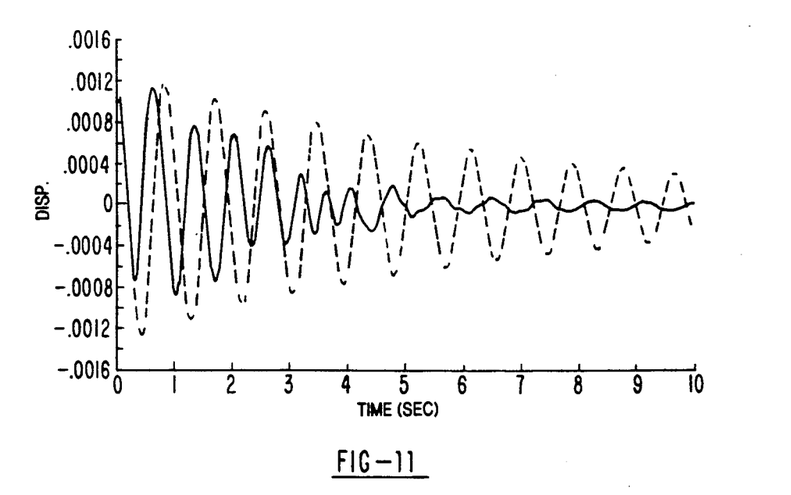
FIG. 11 is a graph depicting results of a simulation based upon the model in FIG. 10.

The third simulation example, illustrated in FIGS. 10 and 11, relates to a three-story, two-dimensional frame structure 9. Structure 9 further comprises columns 11 and beams 10. Stiffenable braces 22 are provided at each story.

In a test example, the areas of columns, beams, and braces are, respectively, 0.036, 0.036, and 0.1 square meters ($m^2$). The respective lengths of columns, beams, and braces are 0.00454, 0.00454, and 0 meters quadrupled ($m^4$). Density ($\rho$) is 7856 Kg/$m^3$, while mass per unit length is 34,300 Kg/m. The elastic modulus is 200 MegaPascals (MPa). The structure was modeled with consistent stiffness and mass matrices for a total of 18 degrees of freedom. The structure was subjected to a first mode initial displacement and allowed to vibrate without further excitation.

FIG. 11 depicts the displacement of the top floor with a modal transference control (solid line) as contrasted with the uncontrolled reference (dotted line). For the controlled response, the control objective was to minimize first mode energy. By contrasting the two plots, the top story deflections are seen to be significantly decreased after four (4) seconds with modal energy transference control.

Figure 12A:
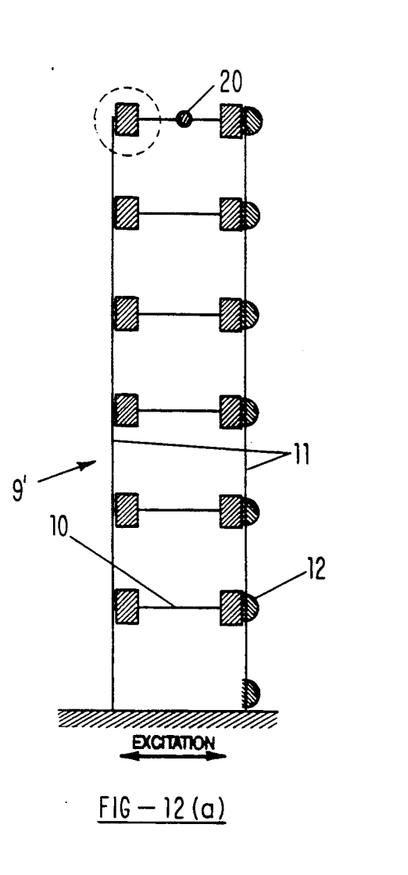
FIG. 12(a) is a perspective view of a multibody system.
Figure 12B:
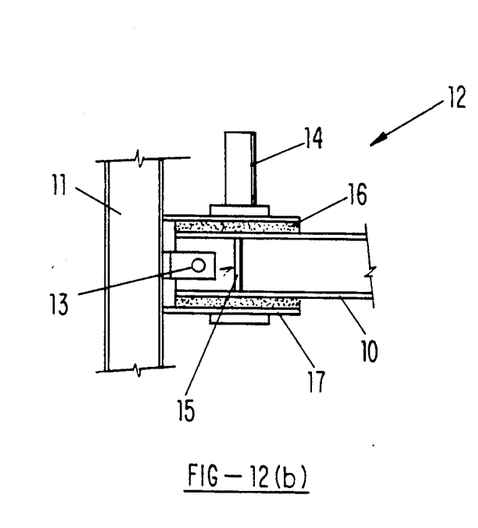
FIG. 12(b) is a magnification of the FIG. 12(a) view showing parallel controllable beam-column connections.

FIGS. 12(a) and 12(b) schematically depict a multibody structural system 9', such as might be found in a high-rise building or a space station. Beam 10 is normally only pinned to column 11 by pin 13, thereby permitting a predetermined amount of relative motion between members. Members 10 and 11 are thus relaxed relative to each other and are thereby candidates for control. As illustrated, a plurality of beams 10 are in parallel.

The states of tension, compression, and relaxation of each beam 10 are sensed and monitored by strain gauges 20. Strain gauges 20 may comprise accelerometers, resistive, piezoelectric and magnetostrictive strain gauges, as well as other strain gauges well known to those ordinarily skilled in the art.

Additionally, each beam 10 comprises global sensor 12 in proximity thereto. Global sensors 12 comprise transducers which sense selected vectorial conditions in the building, including displacement, velocity or acceleration.

Processing of sensed energy in the structure may result in a determination by the preferred embodiment of the invention that a predetermined number of beams 10 require stiffening or relaxing. Accordingly, as an example, piston 14 is actuated, thereby clamping beam 10 and column 11 together between pads 16 and 17. Accordingly, by clamping or releasing pinned connections in accordance with the preferred method of the invention, energy is transferred to higher vibrational modes, thereby dissipating energy at a faster rate and reducing structural displacements. Other parallel beams 10 could also be cantilevered, thereby controlling redundancies, by other exemplary clamping means well known in the art, for example, electromagnetic clamps, solenoid actuators, adaptive memory alloy actuators (e.g., NITINOL®), and the like.

Figure 13:
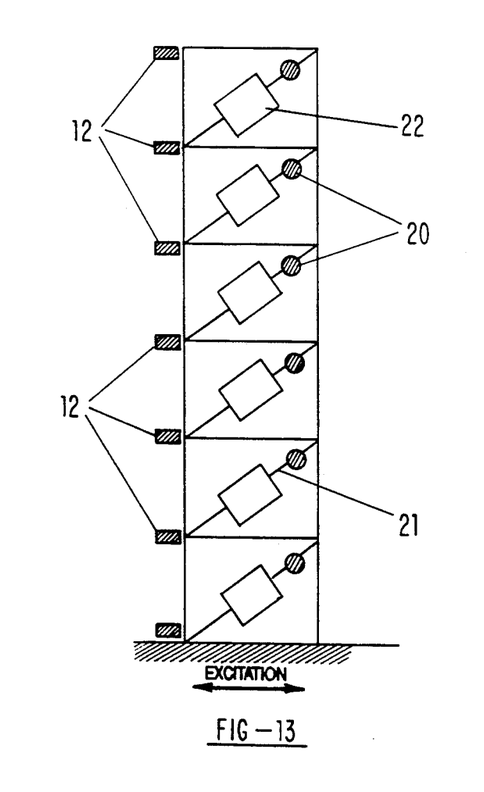
FIG. 13 is a perspective view of diagonal controllable cross braces in a multibody system.

FIG. 13 schematically illustrates an alternative multibody structure similar to FIG. 10, wherein lockable relatively slidable cross braces 21 are provided. Locking devices 22, which likewise may comprise pneumatic pistons, electromagnetic clamps and solenoids, shaped memory alloy actuators (for example NITINOL®) and other means well known in the art, are similarly selectively actuated. Cross braces 21 are thereby added or deleted as structural components; each cross brace effectively represents springs in parallel. Accordingly, by connecting or releasing cross braces in accordance with the preferred method of the invention, energy is transferred into higher modes of vibration, resulting in quicker energy dissipation and reduced amplitude of vibration.

The structures of FIGS. 12(a), 12(b) and 13 all comprise global sensors or transducers 12 and strain gauges 20. Global sensors 12 sense selected vectorial conditions in the structure, such as displacement, velocity or acceleration. Similarly, strain gauges 20 sense strain (spring states of compression, tension, or relaxation) in the structure.

Sensors 12 may comprise displacement transducers, such as strain gauges, linear variable displacement transducers of the moving coil or moving magnet types, laser interferometers, force sensing resistors, or optical displacement gauges. Further, displacement transducers may comprise sonar, radar, and laser ranging devices. Those ordinarily skilled in the art will recognize that various other displacement transducers may be utilized in accordance with the invention.

Sensors 12 may also comprise velocity transducers, such as piezoelectric film transducers, and other velocity transducers well known in the art Additionally, of course, the output from displacement transducers may be differentiated once with respect to time to attain velocity, and twice with respect to time to derive acceleration.

Sensors 12 may further comprise acceleration transducers, such as piezoelectric, strain gauge, or magnetostrictive accelerometers, geophones, and other acceleration transducers well-known to those ordinarily skilled in the art. Additionally, of course, acceleration may be derived by differentiating displacement twice with respect to time, and velocity, once with respect to time.

Similarly, velocity may be derived by integrating acceleration once with respect to time, while displacement is derived by integrating acceleration twice with respect to time.

As described, initial sensing of vibration within the structure results in a predetermined number of structural components being locked or relaxed in a preselected mode. Such predetermination may result from empirical testing of models or may merely comprise estimates of required stiffness.

The entire number of structural components which may be stiffened or locked may comprise a set of such lockable structural components while the actual predetermined number of structural components to be initially locked upon detecting vibration within the structure may comprise a subset of such lockable or stiffenable structural components.

Figure 14:
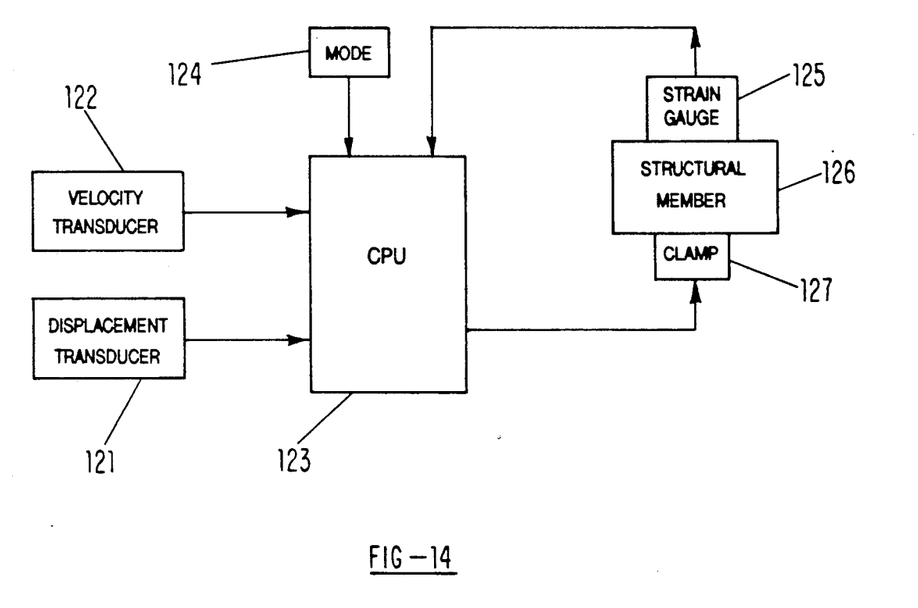
FIG. 14 is a simplified block diagram of the preferred apparatus of the invention.

FIG. 14 is a simplified block diagram of the preferred apparatus of the invention. Displacement transducer 121 and velocity transducer 122 provide respective inputs of displacement and velocity into CPU or processor 123. Alternatively, velocity and displacement may be computed from acceleration input derived from an acceleration transducer. Mode 124 comprises the predetermined number or subset of locked structural components to be stiffened upon initial detection of vibration. Mode 124 may comprise a constant derived from empirical model testing or may comprise a constant derived by estimate. Strain gauge 125 provides information relative to the spring state of controllable structural member 126, whether in compression, tension, or relaxation. Clamp 127, which may comprise a pneumatic piston, an electromagnetic clamp, shaped memory alloy or other stiffening means well-known to those ordinarily skilled in the art, is activated as an output from CPU 123. Actuation of clamp 127 may comprise relaxing as well as stiffening of clamp 127.

In practice, CPU 123 receives input of selected vectorial components (for example, velocity and displacement) and strain in various structural components, in accordance with the flow chart depicted in FIG. 3. Total vibrational energy in the structure is then computed by CPU 123, according to equation (6). If this total energy falls below some acceptable level, control terminates.

Assuming an unacceptable level of energy in the structure, equation (3) is used by CPU 123 to convert global coordinates into modal coordinates for each of the possible control candidates. Modal matrices are based on structural constants characteristic of the structure and stored in memory.

Subsequently, potential and kinetic energies of structural control candidates are computed by CPU 123, as is the cost (equation (13)). Minimum cost control action is then initiated, and the method repeated.

Although the invention has been described with reference to these preferred embodiments other embodiments can achieve the same results. For example, other controllable structural members (not shown) would parallel structural member 126 in a multibodied structure, as depicted in FIGS. 12(a), 12(b) and 13. Further, laminar structures (not shown) could use controllable fluids, such as ferrofluids, electrorheological fluids, and the like, as stiffening agents. Other variations and modifications of the present invention will be obvious to those skilled in the art, and it is intended to cover in the appended claims all such modifications and equivalents.

What is claimed is:

1. A method of attenuating vibration in a structure comprising the steps of:
    a) measuring strain in predetermined structural components within the structure;
    b) sensing the magnitude of selected vectorial conditions within the structure by sensors within the structure;
    c) calculating modal energy of the structure from the sensed vectorial conditions; and
    d) dynamically changing the stiffness of selected ones of the predetermined structural components of the structure, thereby changing the vibration characteristics of the modal energy of the structure.

2. The method of claim 1 wherein the step of sensing the magnitude of selected vectorial conditions within the structure comprises sensing acceleration.

3. The method of claim 1 wherein the step of sensing the magnitude of selected vectorial conditions within the structure comprises sensing velocity.

4. The method of claim 1 wherein the step of sensing the magnitude of selected vectorial conditions within the structure comprises sensing displacement.

5. The method of claim 1 wherein the step of dynamically changing the stiffness of selected structural components of the structure comprises relaxing selected structural components of the structure.

6. The method of claim 5 wherein the step of relaxing selected structural components comprises actuating a clamping electromagnet.

7. The method of claim 5 wherein the step of relaxing selected structural components comprises actuating a changing piston.

8. The method of claim 5 wherein the step of relaxing selected structural components comprises actuating an electrorheological fluid.

9. The method of claim 5 wherein the step of relaxing selected structural components comprises actuating a ferrofluid.

10. The method of claim 5 wherein the step of relaxing selected structural components comprises the step of actuating an adaptive memory alloy member.

11. The method of claim 1 wherein the step of dynamically changing the stiffness of selected structural components comprises stiffening selected structural components.

12. The method of claim 11 wherein the step of stiffening selected structural components of the structure comprises actuating a clamping electromagnet.

13. The method of claim 11 wherein the step of stiffening selected structural components of the structure comprises actuating a clamping piston.

14. The method of claim 11 wherein the step of stiffening selected structural components of the structure comprises actuating an electrorheological fluid.

15. The method of claim 11 wherein the step of stiffening selected structural components of the structure comprises actuating a ferrofluid.

16. The method of claim 11 wherein the step of stiffening selected structural components of the structure comprises actuating an adaptive memory alloy member.

17. An apparatus for attenuating vibration in a structure comprising:
    means for measuring strain on predetermined structural components within the structure for measuring strain in said predetermined structural components;

means within said structure for sensing the magnitude of selected vectorial conditions within said structure;

means for calculating modal energy of said structure from said sensed vectorial conditions; and means for dynamically changing the stiffness of selected ones of said predetermined structural components of said structure, thereby changing the vibration characteristics of the modal energy of said structure.

18. The invention of claim 17 wherein said means for measuring strain is selected from the group consisting of resistive strain gauges, magnetostrictive strain gauges, piezoelectric strain gauges and accelerometers.

19. The invention of claim 17 wherein said means for sensing said magnitude of selected vectorial conditions within the structure comprises means for sensing acceleration.

20. The invention of claim 19 wherein the means for sensing acceleration is selected from the group consisting of accelerometers, geophones resistive strain gauges piezoelectric strain gauges, magnetostrictive strain gauges, and means for differentiating velocity.

21. The invention of claim 17 wherein said means for sensing said magnitude of selected vectorial conditions within the structure comprises means for sensing velocity.

22. The invention of claim 21 wherein the means for sensing velocity is selected from the group consisting of piezoelectric films, linear variable displacement transducers and means for differentiating displacement.

23. The invention of claim 17 wherein said means for sensing said magnitude of selected vectorial conditions within the structure comprises means for sensing displacement.

24. The invention of claim 23 wherein the means for sensing displacement comprises at least one member selected from the group consisting of strain gauges, linear variable displacement transducers, laser interferometers force sensing resistors, optical displacement gauges, sonar, radar, and laser ranging devices.

25. The invention of claim 17 wherein the means for dynamically changing the stiffness of selected structural components of the structure comprises means for relaxing selected structural components of the structure.

26. The invention of claim 25 wherein the means for relaxing selected structural components comprises clamping electrorheological means.

27. The invention of claim 25 wherein the means for relaxing selected structural components comprises clamping piston means.

28. The invention of claim 25 comprises electrorheological fluid means.

29. The invention of claim 25 comprises ferrofluid means.

30. The invention of claim 25 comprises adaptive memory alloy means.

31. The invention of claim 17 wherein the means for dynamically changing the stiffness of selected structural components of the structure comprises means for stiffening selected structural components of the structure.

32. The invention of claim 31 wherein said means of stiffening selected structural components comprises clamping electromagnet means.

33. The invention of claim 31 wherein said means of stiffening selected structural components comprises clamping piston means.

34. The invention of claim 31 wherein said means of stiffening selected structural components comprises electrorheological fluid means.

35. The invention of claim 31 wherein said means of stiffening selected structural components comprises ferrofluid means.

36. The invention of claim 31 wherein said means of stiffening selected structural components comprises adaptive memory alloy means.

* * * * *